United States Patent
Ferlitsch

(10) Patent No.: US 7,921,420 B2
(45) Date of Patent: Apr. 5, 2011

(54) SYSTEMS AND METHODS FOR UPDATING IMAGING DEVICE DRIVERS ON ONE OR MORE COMPUTER SYSTEMS

(75) Inventor: Andrew R. Ferlitsch, Tigard, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 1321 days.

(21) Appl. No.: 11/118,849

(22) Filed: Apr. 29, 2005

(65) Prior Publication Data
US 2006/0244986 A1 Nov. 2, 2006

(51) Int. Cl.
G06F 9/44 (2006.01)
G06F 15/177 (2006.01)

(52) U.S. Cl. .................. 717/170; 717/172; 709/222
(58) Field of Classification Search ........... 717/170
See application file for complete search history.

(56) References Cited

U.S. PATENT DOCUMENTS

| | | | |
|---|---|---|---|
| 5,845,077 A * | 12/1998 | Fawcett | 709/221 |
| 6,529,784 B1 * | 3/2003 | Cantos et al. | 700/79 |
| 6,725,453 B1 * | 4/2004 | Lucas et al. | 717/178 |
| 6,751,658 B1 * | 6/2004 | Haun et al. | 709/222 |
| 2002/0018681 A1 | 2/2002 | Kageyama | |
| 2002/0095501 A1 | 7/2002 | Chiloyan et al. | |
| 2002/0138567 A1 * | 9/2002 | Ogawa | 709/203 |
| 2003/0023963 A1 * | 1/2003 | Birkholz et al. | 717/172 |
| 2003/0025878 A1 * | 2/2003 | Fredlund et al. | 352/1 |
| 2003/0037325 A1 * | 2/2003 | Hargrove et al. | 717/175 |
| 2003/0041127 A1 * | 2/2003 | Turnbull | 709/220 |
| 2003/0074659 A1 | 4/2003 | Louzoun et al. | |
| 2003/0217192 A1 | 11/2003 | White et al. | |
| 2003/0217357 A1 | 11/2003 | Parry | |
| 2004/0073902 A1 | 4/2004 | Kao et al. | |
| 2004/0120001 A1 | 6/2004 | Boldon | |
| 2009/0109237 A1 * | 4/2009 | Ten | 345/600 |

FOREIGN PATENT DOCUMENTS

| | | |
|---|---|---|
| EP | 1 225 744 | 7/2002 |
| JP | 2001027940 | 1/2001 |
| JP | 2002-063098 | 2/2002 |
| JP | 2002-278906 | 9/2002 |

OTHER PUBLICATIONS

Microsoft® Computer Dictionary, Fifth Edition by Microsoft Corporation, Publisher: Microsoft Press, Pub Date: May 1, 2002, selected page.*

* cited by examiner

Primary Examiner — James D Rutten
(74) Attorney, Agent, or Firm — Austin Rapp & Hardman

(57) ABSTRACT

In an exemplary method, an imaging device that is logically connected to at least one host computer system receives installation of a firmware upgrade. The firmware upgrade includes at least one new feature that is not accessible to the host(s) without a driver upgrade. The firmware upgrade includes the driver upgrade and/or driver upgrade information. In response to receiving installation of the firmware upgrade, the imaging device identifies the host(s) to which it is logically connected. The imaging device sends the driver upgrade and/or the driver upgrade information to the host(s).

16 Claims, 6 Drawing Sheets

SYSTEMS AND METHODS FOR UPDATING IMAGING DEVICE DRIVERS ON ONE OR MORE COMPUTER SYSTEMS

TECHNICAL FIELD

The present invention relates generally to computers and computer-related technology. More specifically, the present invention relates to systems and methods for updating imaging device drivers on one or more computer systems.

BACKGROUND

There are many different kinds of computers in use today. The term "computer system" will be used herein to refer generally to any device or combination of devices that is capable of processing information to produce a desired result. Some examples of computer systems include personal computers, hand-held computers, personal digital assistants (PDAs), servers, mainframes, supercomputers, minicomputers, workstations, microcomputers, microcontrollers, and the like.

"Imaging," as the term is used herein, refers to one or more of the processes involved in the display and/or printing of graphics and/or text. The term "imaging device," as used herein, refers to any electronic device that provides functionality related to imaging. Some examples of imaging devices include printers, copiers, scanners, facsimile devices, document servers, image servers, electronic whiteboards, digital cameras, digital projection systems, medical imaging devices, and so forth.

For various reasons, an imaging device may be logically connected to (i.e., placed in electronic communication with) one or more computer systems, which may be referred to as host computer systems (or simply as hosts). For example, printers are sometimes connected to a network of computer systems. This allows the users of the various computer systems on the network to use the printer.

Where an imaging device is logically connected to one or more host computer systems, the imaging device may be configured as a managed device. In particular, an imaging device may be placed in electronic communication with a device server, which manages the imaging device. Alternatively, an imaging device may be configured for non-managed access. For example, an imaging device may be placed in electronic communication with one or more other hosts in accordance with a peer-to-peer architecture.

From time to time, an imaging device may receive one or more jobs from a host. A job is a specified amount of processing that is performed as a unit by an imaging device. For example, a print job is a single document or a set of documents that is submitted to a printer for printing.

To facilitate communication between a host and an imaging device, the host may include a driver for the imaging device. The driver for a particular imaging device allows applications on the host to be able to communicate with the imaging device without knowing specific details about the imaging device's hardware and internal language.

An imaging device typically includes firmware. From time to time, the firmware within an imaging device may be upgraded. When this occurs, the host(s) that are connected to the imaging device may not be able to utilize the new features provided by the firmware upgrade without a corresponding upgrade to their imaging device drivers.

Unfortunately, known systems and methods for updating imaging device drivers on host computer systems suffer from various drawbacks. Accordingly, benefits may be realized by improved systems and methods for updating imaging device drivers on host computer systems. Some exemplary systems and methods for updating imaging device drivers on host computer systems are described herein.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

DETAILED DESCRIPTION

Figure 1:
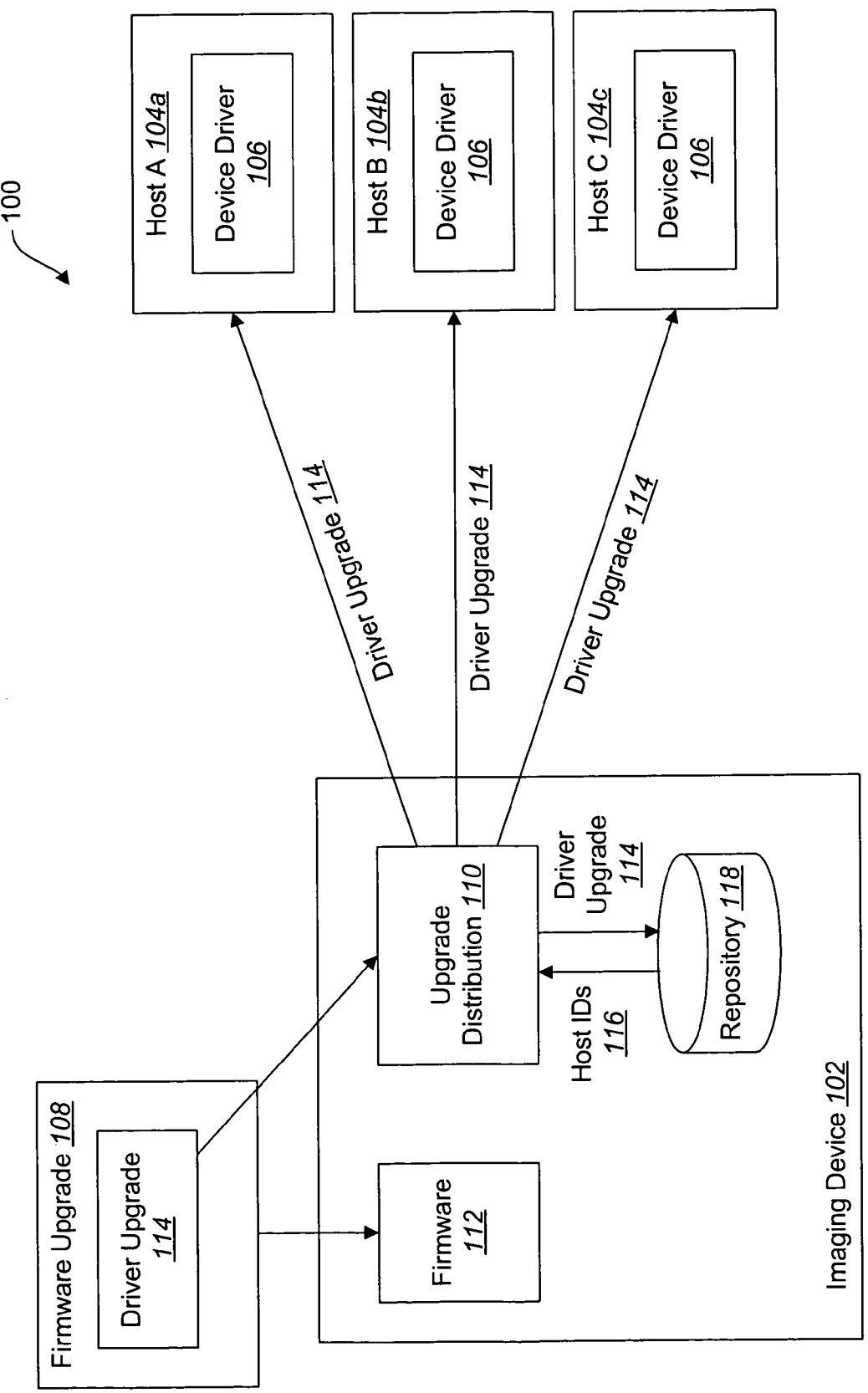
FIG. 1 is a block diagram which illustrates some components in an embodiment of a system for updating imaging device drivers on one or more computer systems, including an imaging device and multiple host computer systems.

A method for updating device drivers on at least one host computer system is disclosed. The method may be implemented in an imaging device that is logically connected to the at least one host computer system. The method involves receiving installation of a firmware upgrade. In some embodiments, the firmware upgrade includes a driver upgrade. The driver upgrade may allow access to at least one new feature provided by the firmware upgrade. Alternatively, or in addition, the driver upgrade may include at least one new software correction to an existing driver for properly operating the imaging device.

When the firmware upgrade is installed, the imaging device identifies the at least one host computer system to which the imaging device is logically connected. In some embodiments, this may involve retrieving at least one host identifier from a storage repository. When the at least one host computer system is identified, the imaging device may send the driver upgrade to the at least one host computer system. In some embodiments, the steps of identifying the at least one host computer system and sending at the driver upgrade to the at least one host computer system are performed in response to receiving installation of the firmware upgrade. Before the imaging device sends the driver upgrade to a particular host computer system, the imaging device may verify that the driver upgrade is not already installed on the host computer system.

In some embodiments, the firmware upgrade may include driver upgrade information instead of (or in addition to) the driver upgrade. The driver upgrade information may include a location of the driver upgrade, a version number of the driver upgrade, identification of one or more supported operating environments, etc. The driver upgrade information may be sent to the at least one host computer system instead of (or in addition to) the driver upgrade.

In some embodiments, each time that a job is received from a host computer system, the imaging device determines a host identifier that identifies the host computer system that sent the job. If the host identifier has not previously been recorded in a storage repository, the imaging device may record the host identifier in the storage repository. The host identifier may be a network address of the host computer system, a network user name of an initiator of the job, a network machine name of the host computer system, a universally unique media access control (MAC) address of the host computer system, etc.

In some embodiments, each time that a job is received from a host computer system, the imaging device determines an operating environment identifier that identifies an operating environment for the host computer system that sent the job. If the operating environment identifier has not previously been recorded in a storage repository, the imaging device records the operating environment identifier in the storage repository. In addition, each time that a job is received from a host computer system, the imaging device may update heuristic information that is maintained about the host computer system that sent the job.

The firmware upgrade may include multiple versions of the driver upgrade. Each version may correspond to a different operating environment. The imaging device may, for each host computer system, identify the operating environment for the host computer system. This may involve retrieving an operating environment identifier for the host computer system from a storage repository. Alternatively, this may involve querying the host computer system. The imaging device may then send to the host computer system a version of the driver upgrade that corresponds to the operating environment. If the imaging device is unable to identify the operating environment for the host computer system, the imaging device may send the multiple versions of the driver upgrade to the at least one host computer system.

The imaging device may save the driver upgrade and/or the driver upgrade information. When one or more additional host computer systems become logically connected to the imaging device, the imaging device may send at least one of the driver upgrade and the driver upgrade information to the additional host computer systems.

An imaging device that is configured to implement a method for updating device drivers on at least one host computer system is also disclosed. The imaging device includes a processor, and memory in electronic communication with the processor. Instructions are stored in the memory. The instructions are executable to implement the method described above for updating device drivers on at least one host computer system. A computer-readable medium comprising executable instructions for implementing a method for updating device drivers on at least one host computer system is also disclosed.

Various embodiments of the invention are now described with reference to the Figures, where like reference numbers indicate identical or functionally similar elements. The embodiments of the present invention, as generally described and illustrated in the Figures herein, could be arranged and designed in a wide variety of different configurations. Thus, the following more detailed description of several exemplary embodiments of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

Many features of the embodiments disclosed herein may be implemented as computer software, electronic hardware, or combinations of both. To clearly illustrate this interchangeability of hardware and software, various components will be described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Where the described functionality is implemented as computer software, such software may include any type of computer instruction or computer executable code located within a memory device and/or transmitted as electronic signals over a system bus or network. Software that implements the functionality associated with components described herein may comprise a single instruction, or many instructions, and may be distributed over several different code segments, among different programs, and across several memory devices.

FIG. 1 is a block diagram which illustrates some components in an embodiment of a system 100 for updating imaging device drivers on one or more computer systems. The system 100 includes an imaging device 102. As indicated above, an imaging device 102 is any electronic device that provides functionality related to imaging. Some examples of imaging devices 102 include printers, copiers, scanners, facsimile devices, document servers, image servers, electronic whiteboards, digital cameras, digital projection systems, medical imaging devices, and so forth.

The imaging device 102 is logically connected to multiple host computer systems 104, namely host computer system A 104a, host computer system B 104b, and host computer system C 104c. For example, the imaging device 102 and the hosts 104 may each be connected to a computer network (not shown). The imaging device 102 may be configured as a managed device. Alternatively, the imaging device 102 may be configured for non-managed access. For example, the imaging device 102 and the hosts 104 may be set up for peer-to-peer communication. Each host 104 that is logically connected to the imaging device 102 includes a driver 106 for the imaging device 102.

The imaging device 102 includes firmware 112. At some point, the imaging device 102 receives installation of an upgrade 108 to the firmware 112. There are a variety of ways that the firmware upgrade 108 may be installed. For example, the firmware upgrade 108 may be manually installed through a locally connected port. Alternatively, the firmware upgrade 108 may be manually or automatically installed by a device management application running on a host 104. Alternatively still, the firmware upgrade 108 may be manually or automatically installed by a remote service from a remote site (e.g., web site).

In the illustrated embodiment, a driver upgrade 114 is embedded within the firmware upgrade 108. The driver upgrade 114 may allow access to at least one new feature provided by the firmware upgrade 108. Alternatively, or in addition, the driver upgrade 114 may include at least one new fix (e.g., software correction) to the drivers 106 for properly operating the imaging device 102. In response to the firmware upgrade 108 being installed on the imaging device 102, the imaging device 102 facilitates installation of the driver upgrade 114 on the hosts 104.

In response to the firmware upgrade 108 being installed, the imaging device 102 identifies the host computer systems 104 to which the imaging device 102 is logically connected. In the illustrated embodiment, the imaging device 102 accomplishes this by retrieving host identifiers 116 from a storage repository 118. The host identifiers 116 identify the hosts 104 to which the imaging device 102 is logically connected. Some exemplary ways that the host identifiers 116 may be created and added to the storage repository 118 will be discussed below.

In FIG. 1, the repository 118 that stores the host identifiers 116 is shown as being internal to the imaging device 102. For example, the storage repository 118 may be a hard drive, flash memory, etc. Alternatively, the storage repository 118 may be external to the imaging device 102. For example, the imaging device 102 may have a communication link to an offline storage medium, such as a storage server, a remotely mounted file system, etc.

In some embodiments, once the imaging device 102 identifies the hosts 104 to which it is logically connected, the imaging device 102 may automatically send the driver upgrade 114 to those hosts 104. In the illustrated embodiment, the imaging device 102 may automatically send the driver upgrade 114 to host A 104a, host B 104b, and host C 104c. In this context, the term "automatically" means that the imaging device 102 may send the driver upgrade 114 to the hosts 104 without having to be prompted to do so by a user of the imaging device 102. Alternatively, the operator of the imaging device 102 may manually send the driver upgrade 114 to the hosts 104. For example, the operator of the imaging device 102 (either remotely or from the front panel) may see a display of all the hosts 104 to which the imaging device 102 is logically connected. The operator may then select hosts 104 to receive, not receive, or defer the driver upgrade 114. In FIG. 1, the imaging device 102 is shown as including an upgrade distribution component 110 which implements the functionality of sending the driver upgrade 114 to the hosts 104. The driver upgrade 114 to a host 104 may be filtered based on access rights to a feature of the driver upgrade 114.

There are many different ways that the imaging device 102 may send the driver upgrade 114 to the hosts 104. For example, to send the driver upgrade 114 to a particular host 104, the imaging device 102 may use the network address of the host 104 to establish a communication session with the host 104, such as an FTP session, a raw TCP/IP session, a HTTP session, Web Service (SOAP/XML), etc. If the imaging device 102 does not know the network address of the host 104, the imaging device 102 may obtain the network address by providing the network host name to a DNS server. Once a communication session has been established, the driver upgrade 114 may be pushed to a predetermined directory location on the host 104. The driver upgrade 114 may then be installed via a background process that monitors for updates in a predetermined location. Alternatively, the driver upgrade 114 may be installed via a foreground process.

As another example of how the imaging device 102 may send the driver upgrade 114 to a particular host 104, the imaging device 102 may use the email address of the host's 104 user to email, or instant message (IM), the driver upgrade 114 as an attachment. Once the driver upgrade 114 has been received, the user of the host 104 (or an automated process) may extract the attachment and install the driver upgrade 114.

As another example of how the imaging device 102 may send the driver upgrade 114 to a particular host 104, the imaging device 102 may use the network address of the host 104 to remotely mount a predetermined file system on the host 104. The imaging device 102 may then copy the driver upgrade 114 to a predetermined location on the remotely mounted file system. A background or foreground process on the host 104 may be configured to monitor the predetermined location. When the driver upgrade 114 arrives, the process may install the driver upgrade 114.

As another example of how the imaging device 102 may send the driver upgrade 114 to a particular host 104, the imaging device 102 may send the driver upgrade 114 as a remote procedure call. In particular, the imaging device 102 may run a native or virtual operating system that is compatible for communication with the host's 104 operating system. The imaging device 102 may transmit and install the driver upgrade 114 using the host's 104 application programming interface via a remote procedure call.

The driver upgrade 114 may be compressed and/or encrypted. If the driver upgrade 114 is encrypted, it may use either a transport layer of encryption (e.g., SSL) or a data layer, such as using a public key from the host 104.

The driver upgrade 114 may have configurable options based on the host 104/user preferences. For example, the driver upgrade 114 may be configurable to output PCL or Postscript, and the user may select Postscript. The host 104/user may also have preferred default driver settings (as opposed to the predefined factory settings).

Before the imaging device 102 sends the driver upgrade 114 to a particular host 104, the imaging device 102 may verify that the driver upgrade 114 has not already been installed on the host 104. For example, the imaging device 102 may compare the version number of the driver upgrade 114 to the version number of the device driver 106 that is installed on the host 104. In some embodiments, if the imaging device 102 determines that the driver upgrade 114 has already been installed on the host 104, the imaging device 102 does not send the driver upgrade 114 to the host 104.

The imaging device 102 may save the driver upgrade 114 to the storage repository 118. When one or more additional hosts 104 become logically connected to the imaging device 102, the imaging device 102 may send the driver upgrade 114 to those hosts 104.

Figure 2:
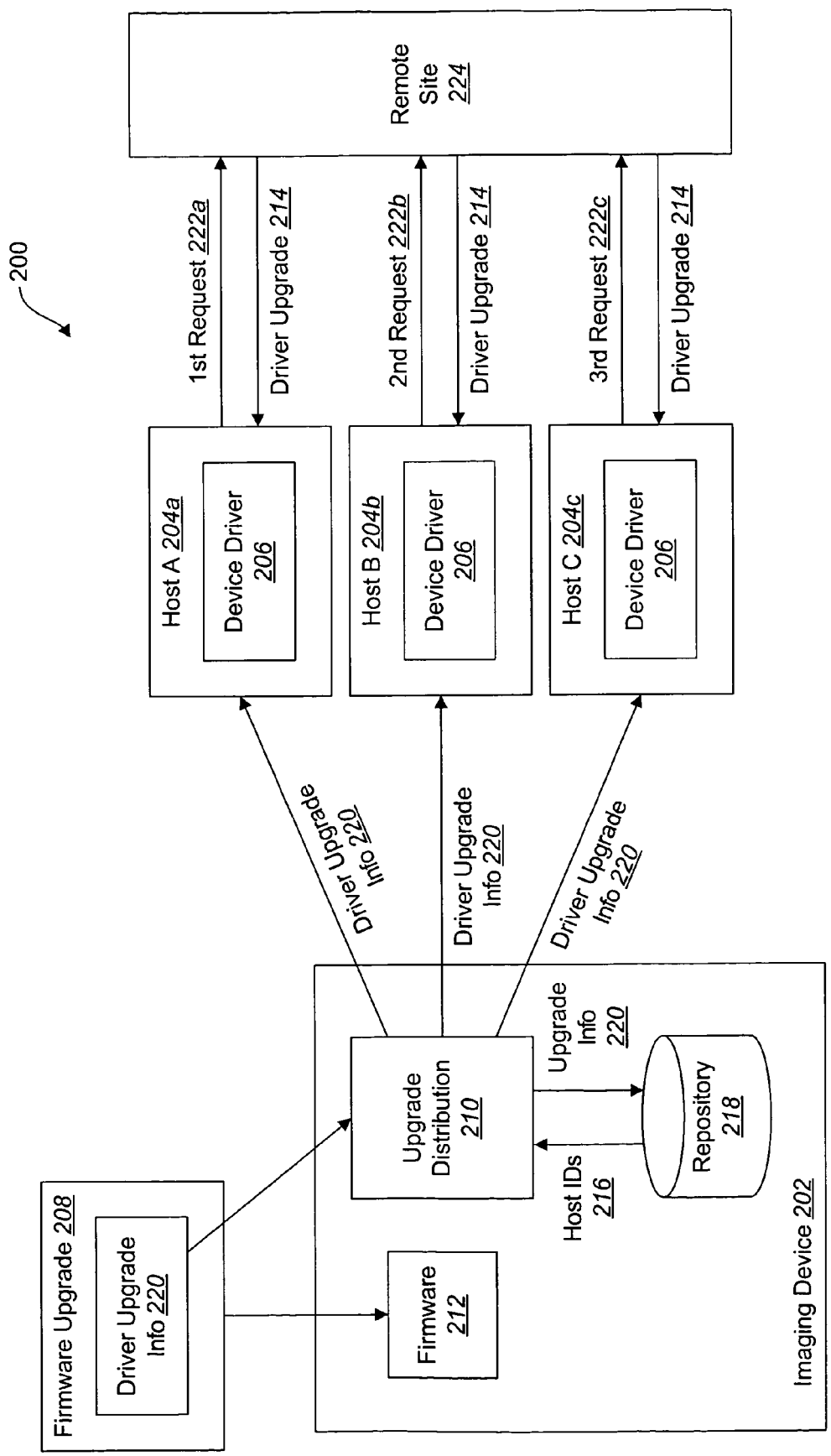
FIG. 2 is a block diagram which illustrates some components in another embodiment of a system for updating imaging device drivers on one or more computer systems, including an imaging device and multiple host computer systems.

FIG. 2 is a block diagram which illustrates some components in another embodiment of a system 200 for updating imaging device drivers on one or more computer systems. As before, the system 200 includes an imaging device 202 that is logically connected to multiple host computer systems 204, namely host computer system A 204a, host computer system B 204b, and host computer system C 204c. Each host 204 that is logically connected to the imaging device 202 includes a driver 206 for the imaging device 202. The imaging device 202 includes firmware 212. At some point, the imaging device 202 receives installation of an upgrade 208 to the firmware 212.

In the embodiment described previously in connection with FIG. 1, a driver upgrade 114 was embedded within the firmware upgrade 108. In contrast, in the embodiment shown in FIG. 2, information 220 about a driver upgrade 214 is embedded within the firmware upgrade 208. As before, the driver upgrade 214 may allow access to at least one new feature provided by the firmware upgrade 208. Alternatively, or in addition, the driver upgrade 214 may include at least one new fix (e.g., software correction) to the drivers 206 for properly operating the imaging device 202.

The driver upgrade information 220 may include a location (e.g., network address, URI) of the driver upgrade 214. The driver upgrade information 220 may also include a version number of the driver upgrade 214. The driver upgrade information 220 may also include an identification of the supported operating environments, i.e., the operating environments for which versions of the driver upgrade 214 are available (a discussion of why this may be beneficial in some embodiments will be provided below).

In response to the firmware upgrade 208 being installed, the imaging device 202 identifies the host computer systems 204 to which the imaging device 202 is logically connected. The imaging device 202 may accomplish this by retrieving host identifiers 216 from a storage repository 218.

Once the imaging device 202 identifies the hosts 204 to which it is logically connected, the imaging device 202 sends the driver upgrade information 220 to those hosts 204. In the illustrated embodiment, the imaging device 202 sends the driver upgrade information 220 to host A 204a, host B 204b, and host C 204c. The imaging device 202 is shown as including an upgrade distribution component 210 which implements the functionality of sending the driver upgrade information 220 to the hosts 204.

Each host 204 uses the driver upgrade information 220 to obtain the driver upgrade 214. In the illustrated embodiment, the driver upgrade information 220 indicates that the driver upgrade 214 is located at a remote site 224. In response to receiving the driver upgrade information 220, each host 204 sends a request 222 for the driver upgrade 214 to the remote site 224. In particular, host A 204a sends a first request 222a to the remote site 224, host B 204b sends a second request 222b to the remote site 224, and host C 204c sends a third request 222c to the remote site 224. The remote site 224 fulfills the requests 222 by sending the driver upgrade 214 to the hosts 204.

The imaging device 202 may save the driver upgrade information 220 to the storage repository 218. When one or more additional hosts 204 become logically connected to the imaging device 202, the imaging device 202 may send the driver upgrade information 220 to those hosts 204.

Figure 3:
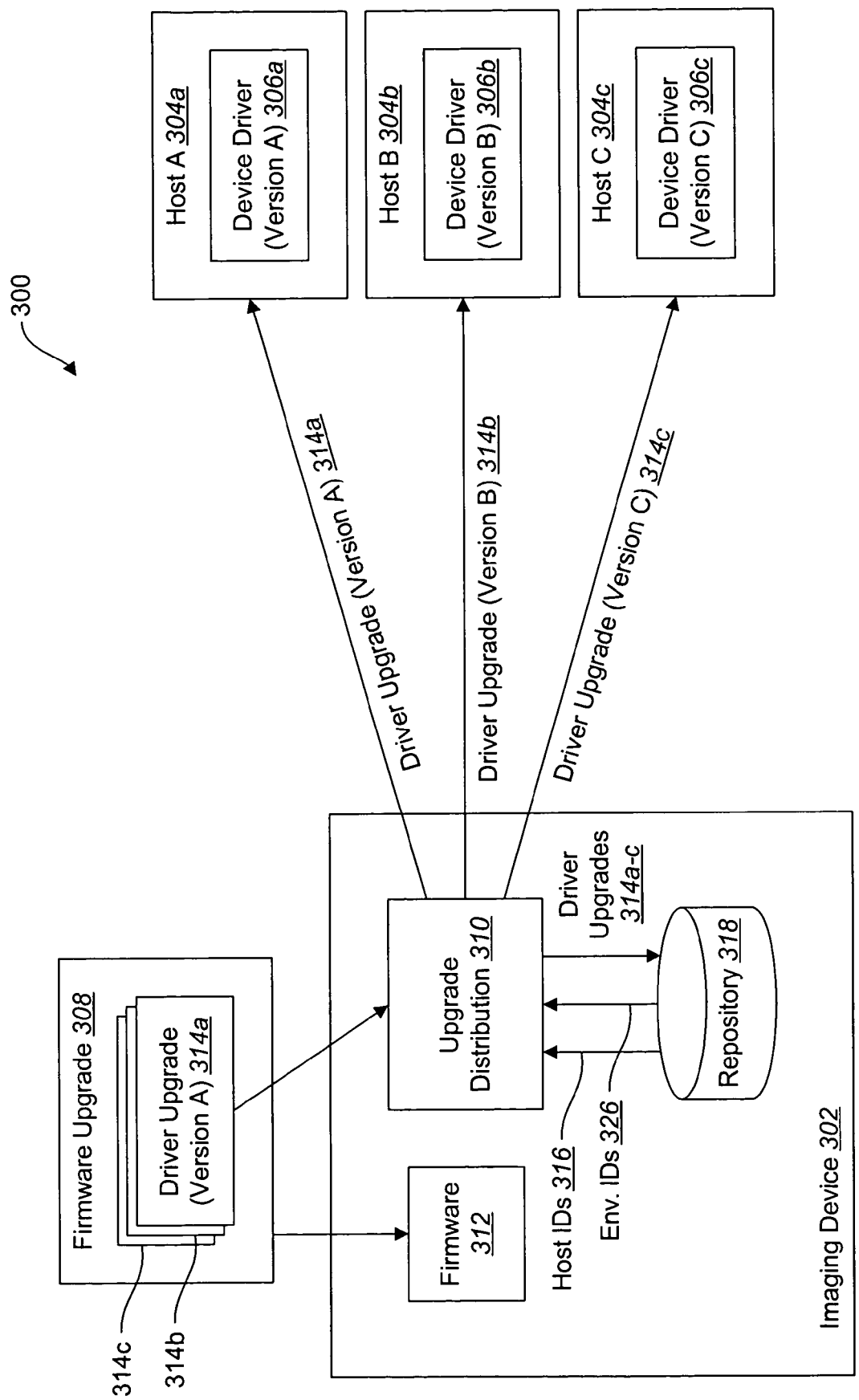
FIG. 3 is a block diagram which illustrates some components in another embodiment of a system for updating imaging device drivers on one or more computer systems, including an imaging device and multiple host computer systems.

FIG. 3 is a block diagram which illustrates some components in another embodiment of a system 300 for updating imaging device drivers on one or more computer systems. As before, the system 300 includes an imaging device 302 that is logically connected to multiple host computer systems 304, namely host computer system A 304a, host computer system B 304b, and host computer system C 304c.

Each host 304 that is logically connected to the imaging device 302 includes a driver 306 for the imaging device 302. In the illustrated embodiment, the hosts 304 do not have the same operating environment. For example, the hosts 304 may be running different operating systems (e.g., Windows XP, Windows 98, Windows 2000, AS/400, Citrix, Macintosh, Linux UNI, etc.). Each host 304 includes a version of the driver 306 that is compatible with the host's 304 operating environment. For example, if a particular host 304 is running the Windows XP operating system, then the host 304 includes a version of the driver 306 that is compatible with the Windows XP operating system. In FIG. 3, host A 304a is shown with version A of the driver 306a, host B 304b is shown with version B of the driver 306b, and host C 304c is shown with version C of the driver 306c.

The imaging device 302 includes firmware 312. At some point, the imaging device 302 receives installation of an upgrade 308 to the firmware 312. Multiple versions of the driver upgrade 314 are embedded within the firmware upgrade 308. In particular, the firmware upgrade 308 includes version A of the driver upgrade 314a, version B of the driver upgrade 314b, and version C of the driver upgrade 314c. The different versions of the driver upgrade 314 correspond to different operating environments.

Each version of the driver upgrade 314 may allow access to at least one new feature provided by the firmware upgrade 308. Alternatively, or in addition, each version of the driver upgrade 314 may include at least one new fix (e.g., software correction) to the drivers 306 for properly operating the imaging device 302.

In response to the firmware upgrade 308 being installed, the imaging device 302 identifies the host computer systems 304 to which the imaging device 302 is logically connected. As indicated above, the imaging device 302 may accomplish this by retrieving host identifiers 316 from a storage repository 318.

For each host 304 that is identified as being logically connected to the imaging device 302, the imaging device 302 identifies the operating environment of the host 304. In the illustrated embodiment, the imaging device 302 identifies the operating environment of a particular host 304 by retrieving an operating environment identifier 326 for the host 304 from the storage repository 318. Some exemplary ways that the operating environment identifiers 326 may be created and added to the storage repository 318 will be discussed below. In alternative embodiments, the imaging device 302 may identify the operating environment of a particular host 304 by querying the host 304.

If the imaging device 302 is able to identify the operating environment for a particular host 304, the imaging device 302 sends to the host 304 a version of the driver upgrade 314 that corresponds to the host's 304 operating environment. In the illustrated embodiment, the imaging device 302 sends version A of the driver upgrade 314a to host A 304a, version B of the driver upgrade 314b to host B 304b, and version C of the driver upgrade 314c to host C 304c. The imaging device 302 is shown as including an upgrade distribution component 310 which implements the functionality of sending the different versions of the driver upgrades 314 to the hosts 304.

In some situations, the imaging device 302 may not be able to identify the operating environment of one or more of the hosts 304. If this occurs, the imaging device 302 may send multiple versions of the driver upgrade 314 to the host(s) 304. For example, in the illustrated embodiment, if the imaging device 302 is not able to identify the operating environment of host A 304a, then the imaging device 302 may send version A 314a, version B 314b, and version C 314c of the driver upgrade to host A 304a.

The imaging device 302 may save the different versions of the driver upgrade 314 that it receives to the storage repository 318. When one or more additional hosts 304 become logically connected to the imaging device 302, the imaging device 302 may identify the operating environment of each additional host 304 and send the appropriate version of the driver upgrade 314 to each additional host 304. Alternatively, the imaging device 302 may send multiple versions of the driver upgrade 314 to the additional host(s) 304.

The discussion provided above in connection with FIGS. 1-3 illustrates various ways that an imaging device 102 may facilitate installation of a driver upgrade 114 on one or more host computer systems 104. In the embodiments described above, when a firmware upgrade 108 is installed on an imaging device 102, the imaging device 102 identifies the host computer systems 104 to which the imaging device 102 is logically connected. As indicated above, this may be accomplished by retrieving host identifiers 116 from a storage repository 118. In addition, in some embodiments, the imaging device 102 may identify the operating environment of the host(s) 104 to which it is logically connected. This may be accomplished by retrieving operating environment identifiers 326 from a storage repository 118.

Figure 4:
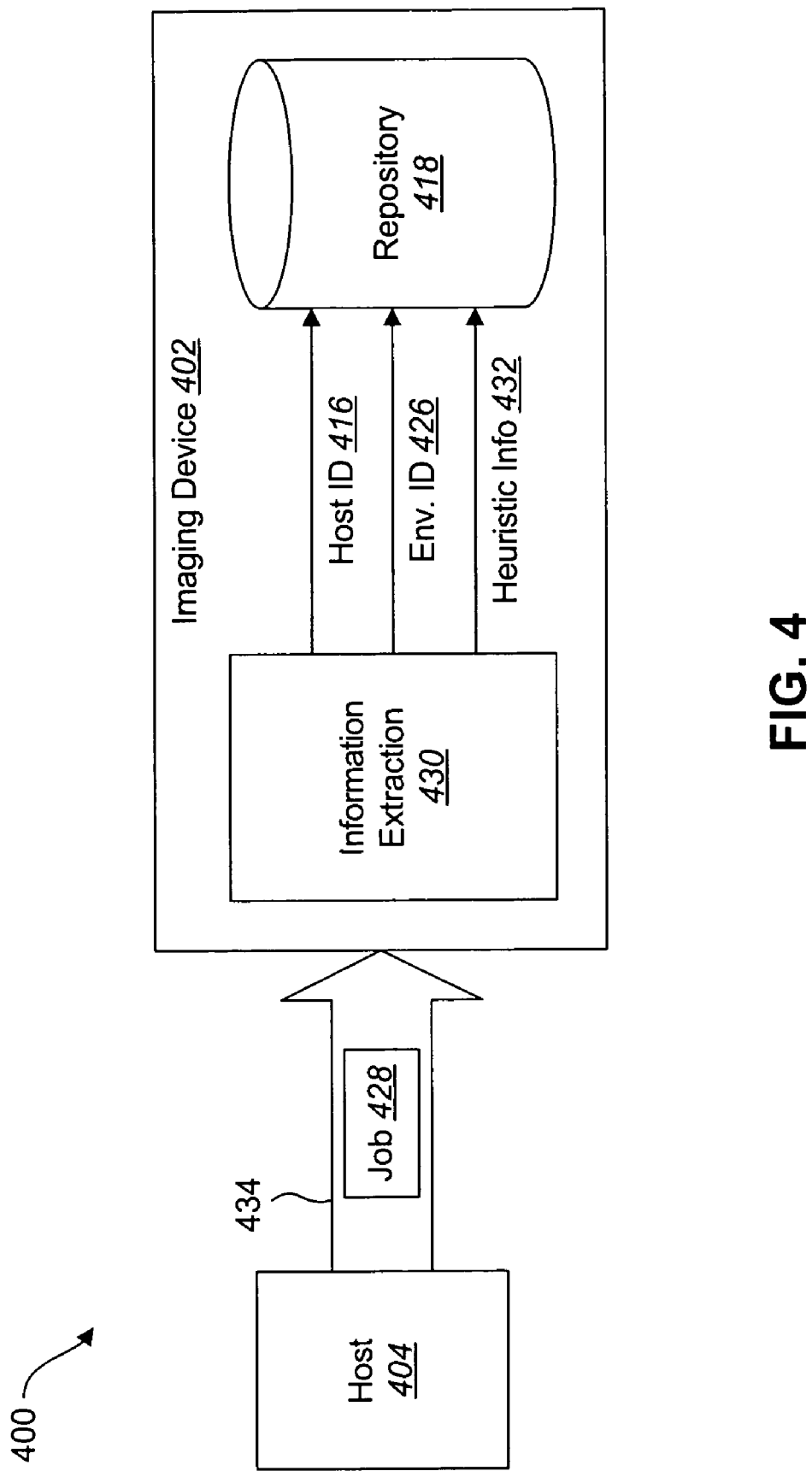
FIG. 4 is a block diagram which illustrates components that may be used to create host identifiers and operating environment identifiers for hosts that are logically connected to an imaging device.

FIG. 4 is a block diagram which illustrates components that may be used to create host identifiers 416 and operating environment identifiers 426 for hosts 404 that are logically connected to an imaging device 402. The system 400 shown in FIG. 4 includes an imaging device 402 that is logically connected to a host computer system 404. From time to time, the imaging device 402 may receive one or more jobs 428 from the host 404. As indicated above, a job 428 is a specified amount of processing that is performed as a unit by an imaging device 402.

The imaging device 402 receives jobs 428 via an input channel 434. Many different kinds of input channels 434 may be used. For example, the input channel 434 may be a wired network (e.g., LPR, 9100, IPP, ftp, http, AppleTalk, etc.), a connectionless wired network (e.g., email), a wireless network (e.g., IrDA, Bluetooth, Wi-Fi), a local connection (e.g., a parallel port, USB port, serial port, etc.), or the like.

Each time that the imaging device 402 receives a job 428, the imaging device 402 determines a host identifier 416 for the host 404 that sent the job 428. The imaging device 402 may determine the host identifier 416 from the input channel 434, from the initial portion of the data stream for the job 428, etc.

In some embodiments, the host identifier 416 may be a network address (e.g., an IP address) of the host 404. There are many different ways that the network address of the host 404 may be obtained. For example, the network address of the host 404 may be obtained from the packet header containing the job 428 data that is transmitted from the host 404 to the imaging device 402. As another example, the job 428 data may contain a command directive that identifies the network address of the host 404. An example of such a command directive is the Sharp AR-M277 printer driver's PJL command for specifying the IP address and port for the notify job return function. The format of this command directive is as follows:

@ PJL SET IPADDRESS="<ipaddress>:<port>"

Alternatively, the host identifier 416 may be the network user name of the initiator of the job. For example, the job 428 data may contain a command directive identifying the network user name of the person who created/de-spooled the job 428 to the imaging device 402. An example of such a command directive is the HP PJL command for identifying the network user name as the owner of a job 428. The format of this command directive is as follows:

@ PJL SET USERNAME="<username>"

Alternatively still, the host identifier 416 may be the network machine name of the host 404. For example, the job 428 data may contain a command directive identifying the network host name of the host 404 which created/de-spooled the job 428 to the imaging device 402. An example of such a command directive is the Sharp AR-M277 printer driver's PJL command for specifying the host name of the host 404. The format of this command directive is as follows:

@ PJL SET PCNAME="<host>"

When a host identifier 416 has been determined, the imaging device 402 determines whether the host identifier 416 has previously been recorded in the storage repository 418. If the host identifier 416 has not previously been recorded, the imaging device 402 records the host identifier 416 in the storage repository 418. In FIG. 4, the imaging device 402 is shown as including an information extraction component 430 which implements the functionality of determining host identifiers 416 and recording them in the storage repository 418.

In addition to determining a host identifier 416 for the host 404 that sent the job 428, the imaging device 402 may also determine an operating environment identifier 426 for the host 404. If the operating environment identifier 426 has not previously been recorded, the imaging device 402 records the operating environment identifier 426 in the storage repository 418.

The imaging device 402 may also update heuristic information 432 that is maintained about the host 404. Some examples of heuristic information 432 that may be maintained include the number of jobs 428 that have been received from the host 404, the timestamp of the last and/or first received job 428, etc.

In other embodiments, the host identifiers 416 may be recorded in the storage repository by other means, such as by manual entry from an operator, or automatically published in a directory service (e.g., Printer Directory Service) when the printer connection is initially installed on the host 404.

Figure 5:
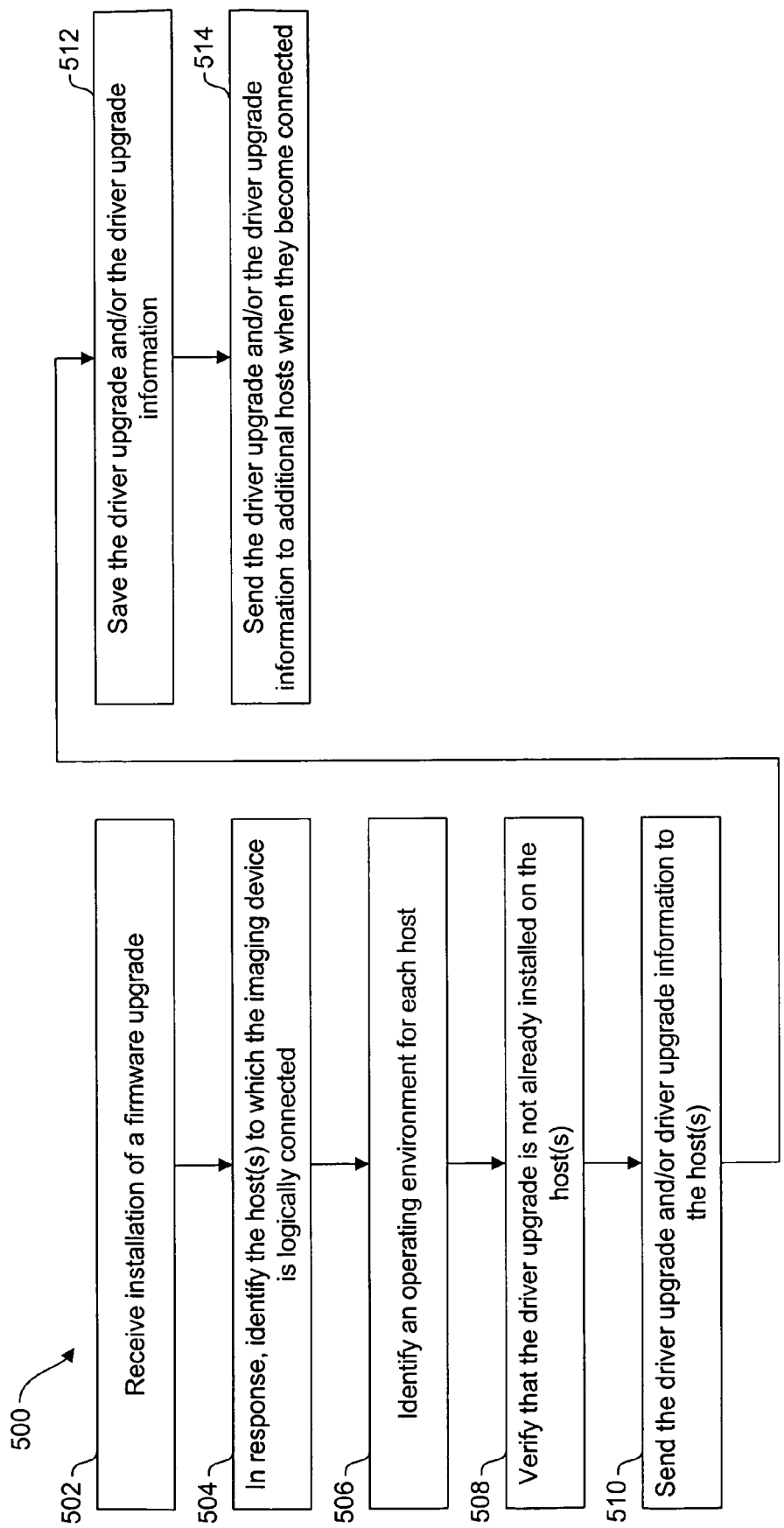
FIG. 5 is a flow diagram which illustrates an embodiment of a method for updating imaging device drivers on one or more host computer systems.

FIG. 5 is a flow diagram which illustrates an embodiment of a method 500 for updating imaging device drivers 106 on one or more host computer systems 104. The method 500 may be performed by various components in an imaging device 102 that is logically connected to one or more hosts 104.

The method 500 begins when an imaging device 102 receives 502 installation of an upgrade 108 to its firmware 112. The firmware upgrade 108 includes a driver upgrade 114, or information 220 about the driver upgrade 114, embedded within the firmware upgrade 114. The driver upgrade 114 may allow access to at least one new feature provided by the firmware upgrade 108. Alternatively, or in addition, the driver upgrade 114 may include at least one new fix (e.g., software correction) to the drivers 106 for properly operating the imaging device 102. In some embodiments, multiple versions of the driver upgrade 114 are embedded within the firmware upgrade 114, each version corresponding to a different operating environment.

In response to the firmware upgrade 108 being installed, the imaging device 102 identifies 504 the hosts 104 to which the imaging device 102 is logically connected. This may be accomplished by retrieving host identifiers 116 from a storage repository 118. The imaging device 102 may also identify 506 an operating environment for each host 104. This may be accomplished by retrieving operating environment identifiers 326 from the storage repository 118.

The imaging device 102 may verify 508 that the driver upgrade 114 is not already installed on the host(s) 104. The imaging device 102 sends 510 the driver upgrade 114 and/or driver upgrade information 220 to each host 104 that does not have the driver upgrade 114 already installed. If the imaging device 102 has identified the operating environment for a particular host 104, the imaging device 102 may send the appropriate version of the driver upgrade 114 for that operating environment. Alternatively, the imaging device 102 may send multiple versions of the driver upgrade 114 to the host(s) 104.

The imaging device 102 may save 512 the driver upgrade 114 and/or the driver upgrade information 220 to the storage repository 118. When one or more additional hosts 104 become logically connected to the imaging device 102, the imaging device 102 may send 514 the driver upgrade 114 and/or the driver upgrade information 220 to those hosts 104.

Figure 6:
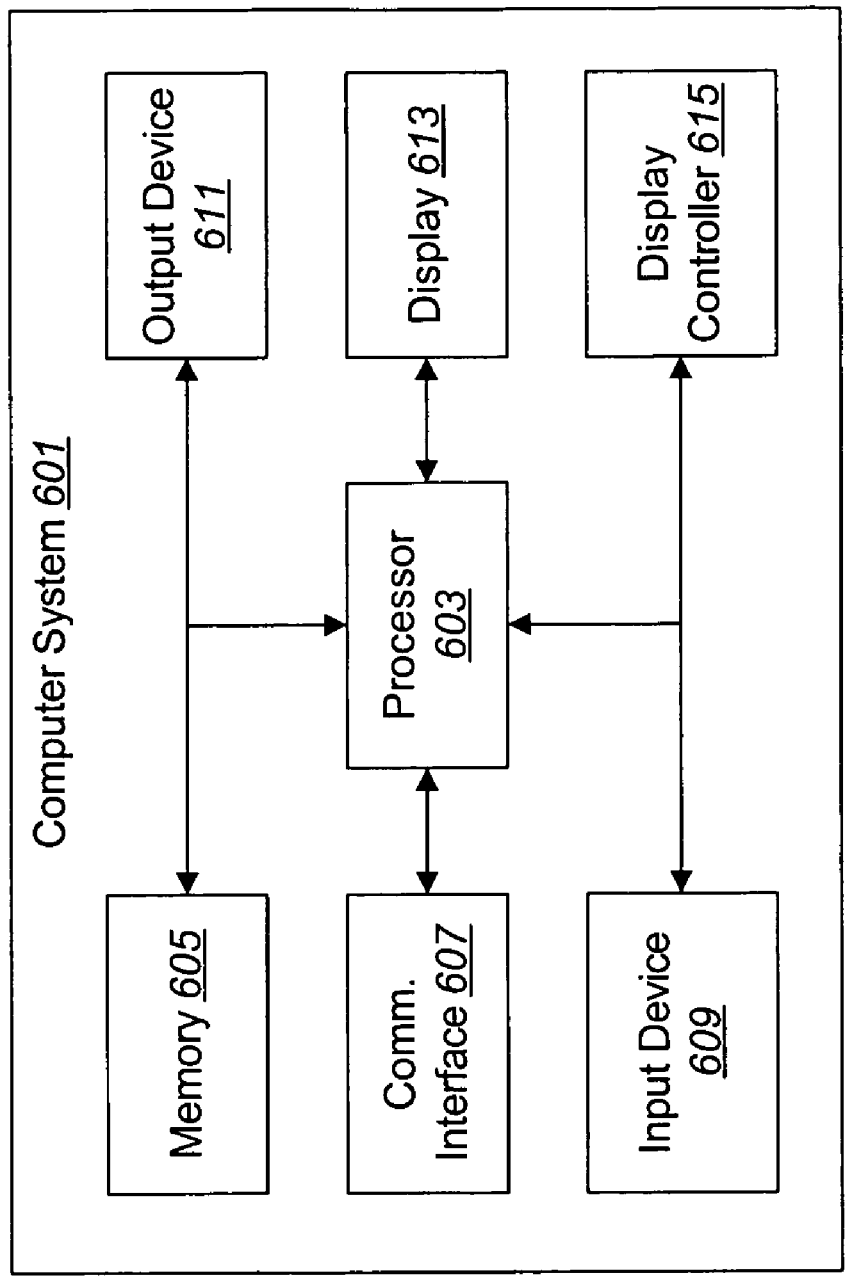
FIG. 6 is a block diagram illustrating the major hardware components typically utilized in a computer system.

FIG. 6 is a block diagram illustrating the major hardware components typically utilized in a computer system 601. The illustrated components may be located within the same physical structure or in separate housings or structures.

The computer system 601 includes a processor 603 and memory 605. The processor 603 controls the operation of the computer system 601 and may be embodied as a microprocessor, a microcontroller, a digital signal processor (DSP) or other device known in the art. The processor 603 typically performs logical and arithmetic operations based on program instructions stored within the memory 605.

As used herein, the term memory 605 is broadly defined as any electronic component capable of storing electronic information, and may be embodied as read only memory (ROM), random access memory (RAM), magnetic disk storage media, optical storage media, flash memory devices in RAM, on-board memory included with the processor 603, EPROM memory, EEPROM memory, registers, etc. The memory 605 typically stores program instructions and other types of data. The program instructions may be executed by the processor 603 to implement some or all of the methods disclosed herein.

The computer system 601 typically also includes one or more communication interfaces 607 for communicating with other electronic devices. The communication interfaces 607 may be based on wired communication technology, wireless communication technology, or both. Examples of different types of communication interfaces 607 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, and so forth.

The computer system 601 typically also includes one or more input devices 609 and one or more output devices 611. Examples of different kinds of input devices 609 include a keyboard, mouse, microphone, remote control device, button, joystick, trackball, touchpad, lightpen, etc. Examples of different kinds of output devices 611 include a speaker, printer, etc. One specific type of output device which is typically included in a computer system is a display device 613. Display devices 613 used with embodiments disclosed herein may utilize any suitable image projection technology, such as a cathode ray tube (CRT), liquid crystal display (LCD), light-emitting diode (LED), gas plasma, electroluminescence, or the like. A display controller 615 may also be provided, for converting data stored in the memory 605 into text, graphics, and/or moving images (as appropriate) shown on the display device 613.

Of course, FIG. 6 illustrates only one possible configuration of a computer system 601. Various other architectures and components may be utilized.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. In an imaging device that is logically connected to at least one host computer system, a method for updating device drivers on the at least one host computer system, comprising:
receiving installation of a firmware upgrade that comprises a driver upgrade included with the firmware upgrade, wherein the driver upgrade allows access to at least one new feature provided by the firmware upgrade and/or comprises at least one new software correction to an existing driver for properly operating the imaging device, wherein the firmware upgrade comprises multiple versions of the driver upgrade, each version corresponding to a different operating environment;

identifying the at least one host computer system to which the imaging device is logically connected; and sending the driver upgrade to the at least one host computer system, wherein the driver upgrade is sent independently from a print job being received, and wherein the steps of identifying the at least one host computer system and sending the driver upgrade to the at least one host computer system are performed in response to receiving installation of the firmware upgrade, wherein the multiple versions of the driver upgrade are sent to the at least one host computer system.

2. The method of claim 1, wherein the imaging device is selected from the group consisting of a printer, a copier, a scanner, a facsimile device, a document server, an image server, an electronic whiteboard, an electronic publishing device, a digital camera, a digital projection system, an audio player/recorder, and a medical imaging device.

3. The method of claim 1, wherein identifying the at least one host computer system comprises retrieving at least one host identifier from a storage repository.

4. The method of claim 1, further comprising, each time that a job is received from a host computer system:
determining a host identifier that identifies the host computer system that sent the job; and
if the host identifier has not previously been recorded in a storage repository, recording the host identifier in the storage repository.

5. The method of claim 4, wherein the host identifier is selected from the group consisting of a network address of the host computer system, a network user name of an initiator of the job, a network machine name of the host computer system, and a universally unique media access control (MAC) address of the host computer system.

6. The method of claim 1, further comprising, each time that a job is received from a host computer system:
determining an operating environment identifier that identifies an operating environment for the host computer system that sent the job; and
if the operating environment identifier has not previously been recorded in a storage repository, recording the operating environment identifier in the storage repository.

7. The method of claim 1, further comprising, each time that a job is received from a host computer system, updating heuristic information that is maintained about the host computer system that sent the job.

8. The method of claim 1, further comprising, for each host computer system:
identifying an operating environment for the host computer system; and
sending to the host computer system a version of the driver upgrade that corresponds to the operating environment.

9. The method of claim 8, wherein identifying the operating environment comprises retrieving an operating environment identifier for the host computer system from a storage repository.

10. The method of claim 8, wherein identifying the operating environment comprises querying the host computer system.

11. The method of claim 1, further comprising, for each host computer system, verifying that the driver upgrade is not already installed on the host computer system.

12. The method of claim 1, further comprising:
saving at least one of the driver upgrade and the driver upgrade information; and
when one or more additional host computer systems become logically connected to the imaging device, sending at least one of the driver upgrade and the driver upgrade information to the one or more additional host computer systems.

13. The method of claim 1, wherein the imaging device is configured for non-managed access.

14. The method of claim 1, wherein the imaging device is configured as a managed device.

15. An imaging device that is configured to implement a method for updating device drivers on at least one host computer system, the imaging device comprising:
a processor;
memory in electronic communication with the processor;
instructions stored in the memory, the instructions being executable to:
receive installation of a firmware upgrade that comprises a driver upgrade included with the firmware upgrade, wherein the driver upgrade allows access to at least one new feature provided by the firmware upgrade and/or comprises at least one new software correction to an existing driver for properly operating the imaging device, wherein the firmware upgrade comprises multiple versions of the driver upgrade, each version corresponding to a different operating environment;
identify the at least one host computer system to which the imaging device is logically connected; and
send the driver upgrade to the at least one host computer system, wherein the driver upgrade is sent independently from a print job being received, and wherein the instructions to identify the at least one host computer system and send the driver upgrade to the at least one host computer system are executed in response to receiving installation of the firmware upgrade, wherein the multiple versions of the driver upgrade are sent to the at least one host computer system.

16. A computer-readable medium comprising executable instructions for updating device drivers on at least one host computer system, the instructions being executable by an imaging device that is logically connected to the at least one host computer system, the instructions being executable to:
receive installation of a firmware upgrade that comprises a driver upgrade included with the firmware upgrade, wherein the driver upgrade allows access to at least one new feature provided by the firmware upgrade and/or comprises at least one new software correction to an existing driver for properly operating the imaging device, wherein the firmware upgrade comprises multiple versions of the driver upgrade, each version corresponding to a different operating environment;
identify the at least one host computer system to which the imaging device is logically connected; and
send the driver upgrade to the at least one host computer system, wherein the driver upgrade is sent independently from a print job being received, and wherein the instructions to identify the at least one host computer system and send the driver upgrade to the at least one host computer system are executed in response to receiving installation of the firmware upgrade, wherein the multiple versions of the driver upgrade are sent to the at least one host computer system.

* * * * *

UNITED STATES PATENT AND TRADEMARK OFFICE
CERTIFICATE OF CORRECTION

PATENT NO. : 7,921,420 B2
APPLICATION NO. : 11/118849
DATED : April 5, 2011
INVENTOR(S) : Andrew R. Ferlitsch Page 1 of 1

It is certified that error appears in the above-identified patent and that said Letters Patent is hereby corrected as shown below:

In column 7 line 59 please delete "Linux UNI" and replace it with -- Linux/UNIX --.

Signed and Sealed this
Twenty-third Day of August, 2011

David J. Kappos
*Director of the United States Patent and Trademark Office*